US012585960B2

(12) United States Patent
Chang et al.

(10) Patent No.: US 12,585,960 B2
(45) Date of Patent: Mar. 24, 2026

(54) DYNAMICALLY TUNING HYPERPARAMETERS DURING ML MODEL TRAINING

(71) Applicant: INTERNATIONAL BUSINESS MACHINES CORPORATION, Armonk, NY (US)

(72) Inventors: Yuan-Chi Chang, Armonk, NY (US); Venkata Nagaraju Pavuluri, New Rochelle, NY (US); Dharmashankar Subramanian, White Plains, NY (US); Timothy Rea Dinger, Croton-on-Hudson, NY (US)

(73) Assignee: International Business Machines Corporation, Armonk, NY (US)

( * ) Notice: Subject to any disclaimer, the term of this patent is extended or adjusted under 35 U.S.C. 154(b) by 1073 days.

(21) Appl. No.: 17/674,808

(22) Filed: Feb. 17, 2022

(65) Prior Publication Data

US 2023/0259813 A1    Aug. 17, 2023

(51) Int. Cl.
*G06N 3/0985* (2023.01)
*G06N 3/04* (2023.01)
(Continued)

(52) U.S. Cl.
CPC .............. *G06N 3/0985* (2023.01); *G06N 3/04* (2013.01); *G06N 3/08* (2013.01); *G06N 20/00* (2019.01)

(58) Field of Classification Search
CPC .......... G06N 3/0985; G06N 3/04; G06N 3/08; G06N 20/00
See application file for complete search history.

(56) References Cited

U.S. PATENT DOCUMENTS 11,120,368 B2    9/2021  Varadarajan et al.
11,341,420 B2 *  5/2022  Loh ........................ G06N 20/00
(Continued)

FOREIGN PATENT DOCUMENTS

CN    112836796 A    5/2021
CN    111291894 A    6/2021

OTHER PUBLICATIONS

Serqueira et al., "A Population-based Hybrid Approach to Hyperparameter Optimization for Neural Networks" Nov. 27, 2020, arXiv: 2011.11062v2, pp. 1-28. (Year: 2020).*
(Continued)

*Primary Examiner* — Vincent Gonzales
*Assistant Examiner* — Chase P. Hinckley
(74) *Attorney, Agent, or Firm* — CHIP LAW GROUP

(57) ABSTRACT

A method of automatically tuning hyperparameters includes receiving a hyperparameter tuning strategy. Upon determining that one or more computing resources exceed their corresponding predetermined quota, the hyperparameter tuning strategy is rejected. Upon determining that the one or more computing resources do not exceed their corresponding predetermined quota, a machine learning model training is run with a hyperparameter point. Upon determining that one or more predetermined computing resource usage limits are exceeded for the hyperparameter point, the running of the machine learning model training is terminated for the hyperparameter point and the process returns to running the machine learning model training with a new hyperparameter point. Upon determining that training the machine learning model is complete, training results are collected and computing resource utilization metrics are determined. A correlation of the hyperparameters to the computing resource utilization is determined from the completed training of the machine learning model.

19 Claims, 14 Drawing Sheets

(51) Int. Cl.
  *G06N 3/08* (2023.01)
  *G06N 20/00* (2019.01)

(56) References Cited

U.S. PATENT DOCUMENTS

| | | | | |
|---|---|---|---|---|
| 11,537,893 | B2 * | 12/2022 | Hsyu | G06N 3/0985 |
| 2018/0121814 | A1 | 5/2018 | Yu et al. | |
| 2020/0097847 | A1 | 3/2020 | Convertino et al. | |
| 2020/0279187 | A1 * | 9/2020 | Huang | G06F 11/3409 |
| 2021/0035563 | A1 * | 2/2021 | Cartwright | G06N 3/084 |
| 2021/0133555 | A1 | 5/2021 | Qiu et al. | |
| 2021/0224585 | A1 | 7/2021 | Schmidt et al. | |
| 2021/0264263 | A1 * | 8/2021 | Walters | G06F 18/217 |
| 2021/0295191 | A1 * | 9/2021 | Bui | G06V 10/751 |
| 2022/0035672 | A1 * | 2/2022 | Vinod | G06F 9/5077 |
| 2022/0058477 | A1 * | 2/2022 | Hu | G06N 3/0464 |
| 2022/0292303 | A1 * | 9/2022 | Cao | G06F 9/505 |
| 2022/0335329 | A1 * | 10/2022 | Sousa | G06N 3/0985 |
| 2022/0366318 | A1 * | 11/2022 | Wu | G06N 3/0985 |
| 2022/0414533 | A1 * | 12/2022 | Mohanty | G06N 20/00 |
| 2023/0186150 | A1 * | 6/2023 | Belakaria | G06N 7/01 |
| | | | | 706/12 |
| 2023/0214668 | A1 * | 7/2023 | Kawajiri | G06N 3/0499 |
| | | | | 706/25 |

OTHER PUBLICATIONS

Liaw et al., "HyperSched: Dynamic Resource Reallocation for Model Development on a Deadline" Nov. 2019, pp. 61-73. (Year: 2019).*

Dunlap et al., "Elastic Hyperparameter Tuning on the Cloud" Nov. 2021, pp. 33-46. (Year: 2021).*

Rocha et al., "Pipe Tune: Pipeline Parallelism of Hyper and System Parameters Tuning for Deep Learning Clusters" Dec. 2020, pp. 89-104. (Year: 2020).*

Liu et al., "Auptimizer—an Extensible, Open-Source Framework for Hyperparameter Tuning" Nov. 6, 2019, arXiv: 1911.02522v1, pp. 1-10. (Year: 2019).*

Misra et al., "Rubberband: Cloud-based Hyperparameter Tuning" Apr. 2021, pp. 327-342. (Year: 2021).*

Ryu et Sung, "Meta Tune: Meta-Learning Based Cost Model for Fast and Efficient Auto-tuning Frameworks" Feb. 9, 2021, arXiv: 2102.04199v1, pp. 1-11. (Year: 2021).*

Bergstra et Bengio, "Random Search for Hyper-Parameter Optimization" Feb. 2012, pp. 281-305. (Year: 2012).*

Mell, P. et al., "Recommendations of the National Institute of Standards and Technology"; NIST Special Publication 800-145 (2011); 7 pgs.

Schroff, F. et al., "FaceNet: A Unified Embedding for Face Recognition and Clustering"; arXiv:1503.03832v3 [cs.CV] 17 (2015); 10 pgs.

Qiao, S. et al., "Neural Rejuvenation: Improving Deep Network Training by Enhancing Computational Resource Utilization"; arXiv:1812.00481v1 [cs.CV] (2018); 11 pgs.

Jordan, J., "Hyperparameter Tuning for Machine Learning Models"; Data Science (2017); downloaded Jan. 25, 2022 from https://www.jeremyjordan.me/hyperparameter-tuning; 13 pgs.

Moindrot, O. "Triplet Loss and Online Triplet Mining in Tensor Flow"; Olivier Moindrot Blog (2018); downloaded Jan. 25, 2022 from https://omoindrot.github.io/triplet-loss; 25 pgs.

Feurer et al., Auto-sklearn: Efficient and Robust Automated Machine Learning, in Automated Machine Learning, The Springer Series on Challenges in Machine Learning, 2019, pp. 113-134, doi: https://library.oapen.org/bitstream/handle/20.500.12657/23012/1007149.pdf?sequence=1#page=119.

Guo et al., RECORD: Resource Constrained Semi-Supervised Learning under Distribution Shift, KDD '20: Proceedings of the 26th ACM SIGKDD International Conference on Knowledge Discovery & Data Mining, Aug. 20, 2020, pp. 1636-1644, doi: https://doi.org/10.1145/3394486.3403214.

Jamie Fraustro, pytorch/examples, 2 pages, doi: https://github.com/pytorch/examples/tree/main/mnist.

Xoel López Barata, Using 3D visualizations to tune hyperparameters in ML models, Nov. 7, 2018, 11 pages, doi: https://web.archive.org/web/20181203165541/https://towardsdatascience.com/using-3d-visualizations-to-tune-hyperparameters-of-ml-models-with-python-ba2885eab2e9?gi=2b35e3d383e.

* cited by examiner

RECEIVE MODEL TRAINING HYPERPARAMETER SEARCH GRID — 701

INITIALIZE ONE MODEL TRAINING WITH A RANDOM POINT IN THE GRID — 702

MONITOR COMPUTE RESOURCE USAGE DURING THE MODEL TRAINING — 704

CHECK IF USAGE EXCEEDED LIMITS. IF YES, TERMINATE — 706

RECORD HYPERPARAMETERS USED AND IF COMPLETED — 708

700

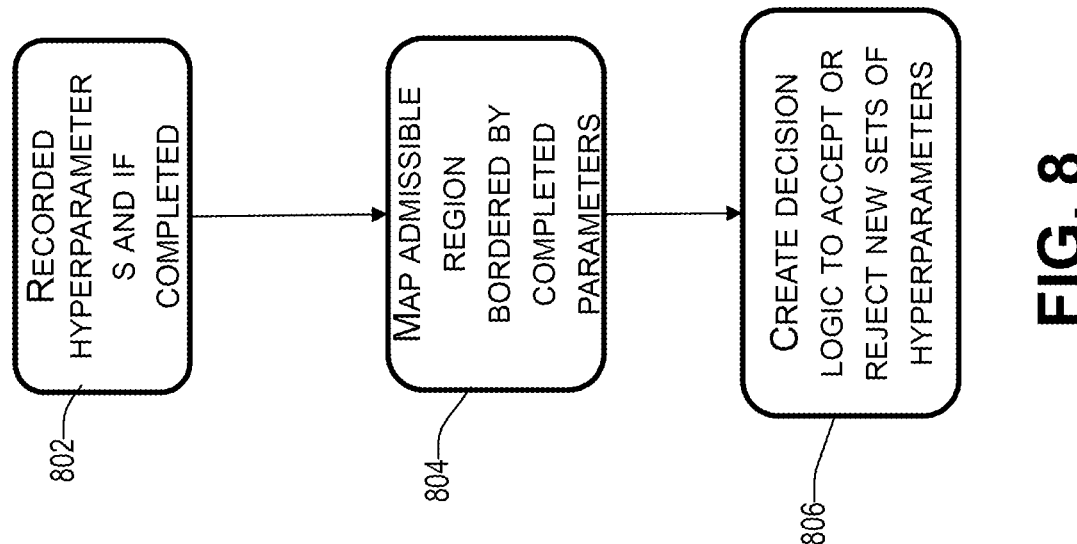
RECORDED HYPERPARAMETER S AND IF COMPLETED
802
MAP ADMISSIBLE REGION BORDERED BY COMPLETED PARAMETERS
804
CREATE DECISION LOGIC TO ACCEPT OR REJECT NEW SETS OF HYPERPARAMETERS
806
FIG. 8
800

DYNAMICALLY TUNING HYPERPARAMETERS DURING ML MODEL TRAINING

BACKGROUND

Technical Field

The present disclosure generally relates to computing devices, and more particularly, to an efficient use of resources of computing devices in developing a machine learning model.

Description of the Related Art

In modern machine learning, hyperparameter tuning involves choosing a set of optimal hyperparameters for a learning algorithm. A hyperparameter is a parameter whose value is used to control the learning process. The same kind of machine learning model can include different constraints, weights, or learning rates to generalize different data patterns. These measures are called hyperparameters, and are tuned so that the model can optimally solve the machine learning problem. Hyperparameter tuning finds a tuple of hyperparameters that yields an optimal model which minimizes a predefined loss function on given independent data.

Many extensions of hyperparameter tuning are used to accommodate specific applications and problem domains, properties of machine learning models, and even characteristics of training datasets. One aspect that is largely unaddressed is computing resource usage during the search of hyperparameter space.

SUMMARY

According to various exemplary embodiments, a computing device, a non-transitory computer readable storage medium, and a method are provided to carry out a method of automatically tuning hyperparameters. Upon determining that one or more computing resources exceed their corresponding predetermined quota for the received hyperparameter tuning strategy, the hyperparameter tuning strategy is rejected and the process returns to receiving a hyperparameter tuning strategy. Upon determining that the one or more computing resources do not exceed their corresponding predetermined quota for the received hyperparameter tuning strategy, a machine learning model training is run with a hyperparameter point of the hyperparameter tuning strategy. Upon determining that one or more predetermined computing resource usage limits are exceeded for the hyperparameter point, the running of the machine learning model training for the hyperparameter point is terminated. The process returns to running the machine learning model training with a new hyperparameter point on the hyperparameter tuning strategy. Upon determining that training the machine learning model is complete, training results are collected and computing resource utilization metrics are determined. From the completed training of the machine learning model, a correlation of the hyperparameters to the computing resource utilization is determined.

In one embodiment, the hyperparameter point of the hyperparameter turning strategy is selected randomly.

In one embodiment, the inference of the correlation of the hyperparameters to the computing resource utilization is additionally based on one or more recorded previously successful completed training of machine learning models.

In one embodiment, the inference of the correlation of the hyperparameters to the computing resource utilization is by way of a probe run.

In one embodiment, the probe run generates a multi-dimensional grid of hyperparameters of permissible hyperparameter combinations.

In one embodiment, the hyperparameter tuning strategy is based on a grid search.

In one embodiment, the hyperparameter tuning strategy is based on a random search.

In one embodiment, running a machine learning model training includes dividing a training data into predetermined batches and iteratively running each training data.

In one embodiment, determining that the one or more computing resources exceed their corresponding predetermined quota for the received hyperparameter tuning strategy is based on each hyperparameter point being within an admissible region of a geometric convex hull in a hyperparameter space of the hyperparameter tuning strategy.

In one embodiment, the correlation of the hyperparameters to the computing resource utilization is inferred by measuring an increasing or decreasing trend of computing resource utilization metrics when a hyperparameter is changed in magnitude.

These and other features will become apparent from the following detailed description of illustrative embodiments thereof, which is to be read in connection with the accompanying drawings.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

FIG. 8 provides a possible continuation of the process of FIG. 7, consistent with an illustrative embodiment.

DETAILED DESCRIPTION

Overview

In the following detailed description, numerous specific details are set forth by way of examples in order to provide a thorough understanding of the relevant teachings. However, it should be apparent that the present teachings may be practiced without such details. In other instances, well-known methods, procedures, components, and/or circuitry have been described at a relatively high-level, without detail, in order to avoid unnecessarily obscuring aspects of the present teachings.

A typical machine learning model, such as deep learning, may initiate training by specifying parameters. Usually, most of the parameters are specified using guess work. For example, there may be an initial determination for the batch size, number of epochs, network layers, timeout, etc. Often, parameter values specified may not be suitable for the dataset being trained on, as the initial parameters may not accommodate all scenarios. Valuable time can be wasted before problems with the specified parameter values supplied can be identified. For example, too large a batch size can be taxing on the memory, as well as the central processing unit (CPU) and the graphics processing unit (GPU) resources. Memory transfers between GPU and CPU are a source of reducing the speed of training a machine learning model. Eventually, an out of memory condition may result in a core dump, wasting training time and the computational resources consumed to arrive at this state. Indeed, once the machine learning training starts, there is often no practical way to modify the parameters if needed. Consequently, the training may be stopped and restarted with a new set of parameters.

Another challenge faced by known systems is not knowing when to stop the training. For example, continued training to satisfy an epoch requirement, even when the model accuracy is not improving, presents a waste of computational resources. Often, a timeout is not specified for training—and even when it is specified, the training may be stopped abruptly without achieving a desired machine learning model accuracy. Also, a determination is not made whether the machine learning model accuracy is near the training goal, to facilitate additional training time to be added (i.e., delta time).

Accordingly, a salient aspect missing in the consideration of hyperparameter tuning is computing resource usage during the search of hyperparameter space. In many machine learning models, different hyperparameters determine the CPU, GPU, memory and sometimes storage IOPS (input/ output operations per second) utilization. Take Convolutional Neural Network (CNN) based models as an example.

Figure 1:
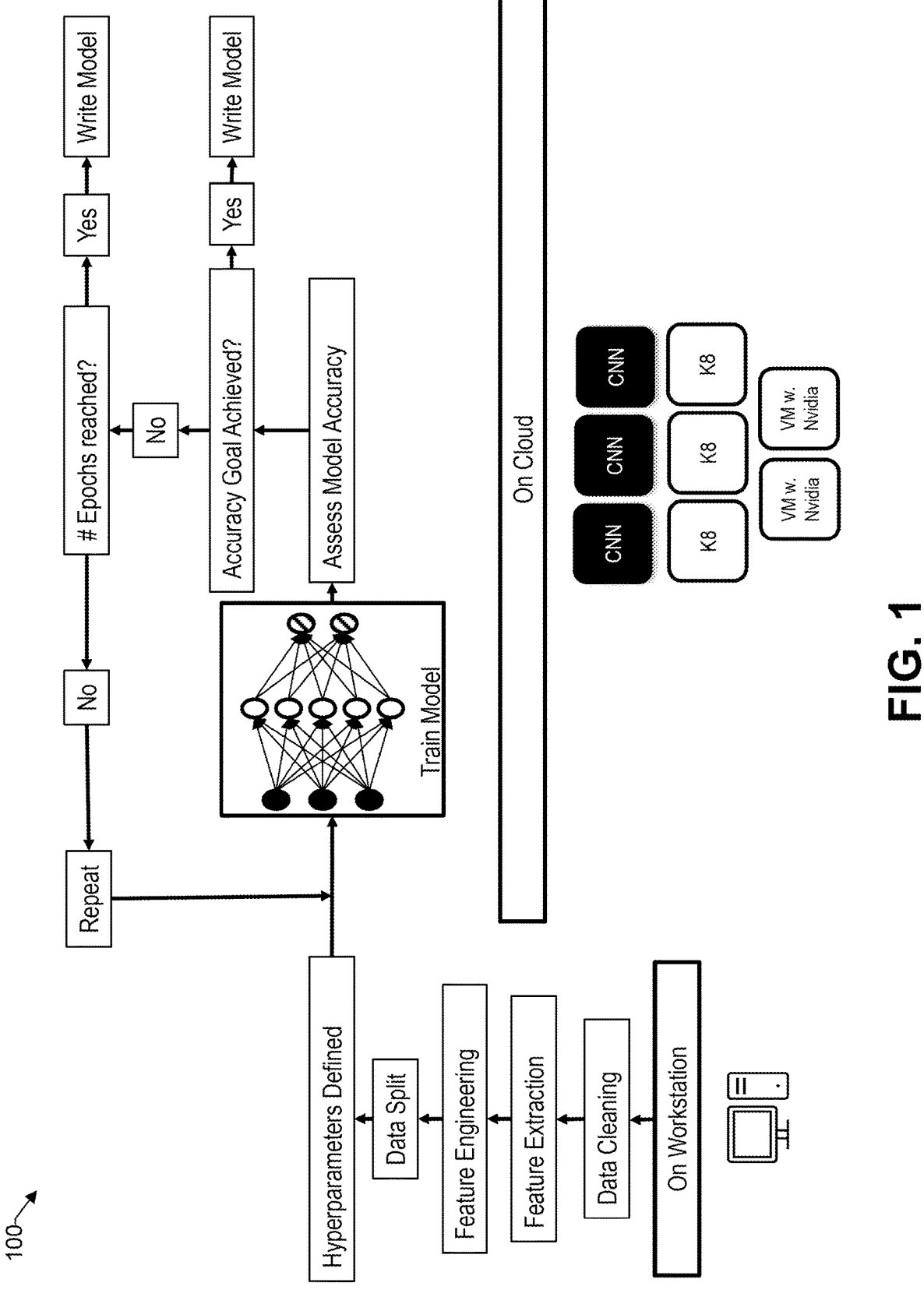
FIG. 1 provides a conceptual block diagram of a known convolutional neural network.

In this regard, reference is made to FIG. 1, which provides a conceptual block diagram 100 of an example CNN. The CNN 100 includes an input layer, one or more hidden layers and an output layer. The more hidden layers a network has, the more neurons it has and the more weights can be learned to make such a model more powerful. In addition, the size of each layer can be configured to capture more complex input data features. Increasing the number of layers or their sizes leads to larger memory usage, as well as higher CPU and GPU utilization. The hyperparameters are often tuned to achieve the best model performance. However, often limited by computing resource availability, not all desired hyperparameter combinations can be accommodated, often leading to model training execution crashing without explanation and ultimately to be manually investigated for cause and restarted by either relying on a bigger machine or tweaking the hyperparameter search to constrain resource usage. It is also costly to employ large and powerful computers, virtual machines, or a networked cluster.

The teachings herein provide a method and system to monitor computing resource usage as hyperparameter tuning progresses. The method terminates a model training execution run early if a hyperparameter combination leads to excessive resource usage, which may be a computing resource budget set by developers or administrators. The method learns from previously successful execution runs and early terminated runs to establish an admissible hyperparameter combination region, which is used to later determine whether a new combination of hyperparameters could be accepted or rejected. By virtue of the teachings herein, there is a technical effect of a reduced time to train a machine learning (ML) model by providing real-time system and model accuracy monitoring information to optimize usage of system resources, as well as conserving valuable computational resources. The techniques described herein may be implemented in a number of ways. Example implementations are provided below with reference to the following figures.

Example Architecture

Figure 2:
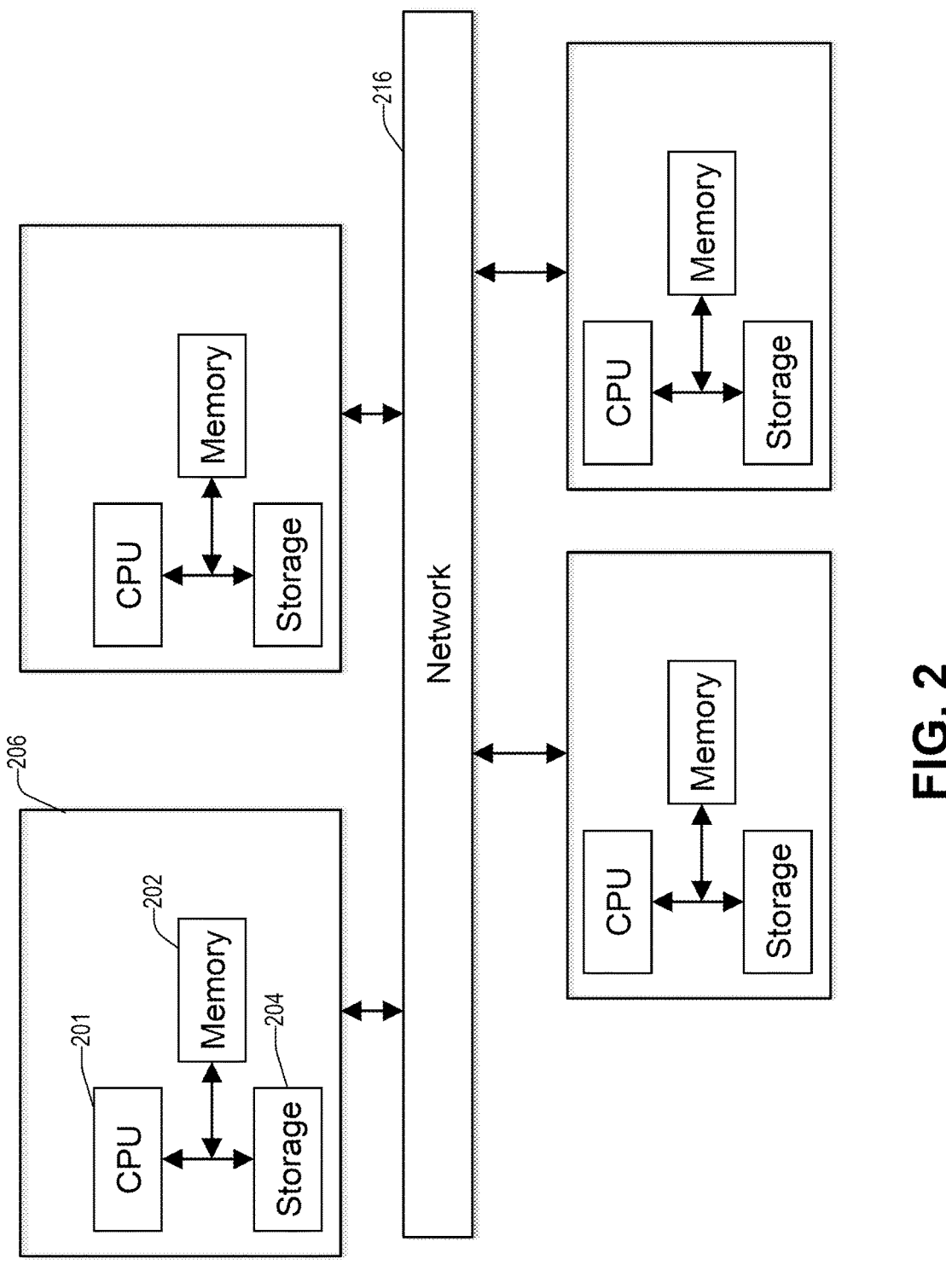
FIG. 2 is an example block diagram of a distributed data processing system in which aspects of the illustrative embodiments can be implemented.

FIG. 2 is an example block diagram of a distributed data processing system 200 in which aspects of the present disclosure may be implemented. Processing system 200 may relate to a single computer server or a cluster of computer servers in which one or more embodiments of the present disclosure can be implemented. The system 200 may include one or more servers, such as servers 206 and 208, which are interconnected via a network 208. Each server, such as server 206, may include one or more central processing unit (CPU) 201, main memory 202 (e.g., volatile memory), and one or more storage devices 204 (e.g., non-volatile memory). For example, code or instructions implementing the processes of the illustrative embodiments are executed by the CPU 201 and located temporarily in the main memory 202. The one or more storage devices 204 can be used to store the instructions as well as a machine learning model that used training data to be processed by the system 200. In other embodiments, one or more of these computing platforms may be implemented by virtual computing devices in the form of virtual machines or software containers that are hosted in the cloud, thereby providing an elastic architecture for processing and storage. The cloud is discussed in more detail later.

Figure 3:
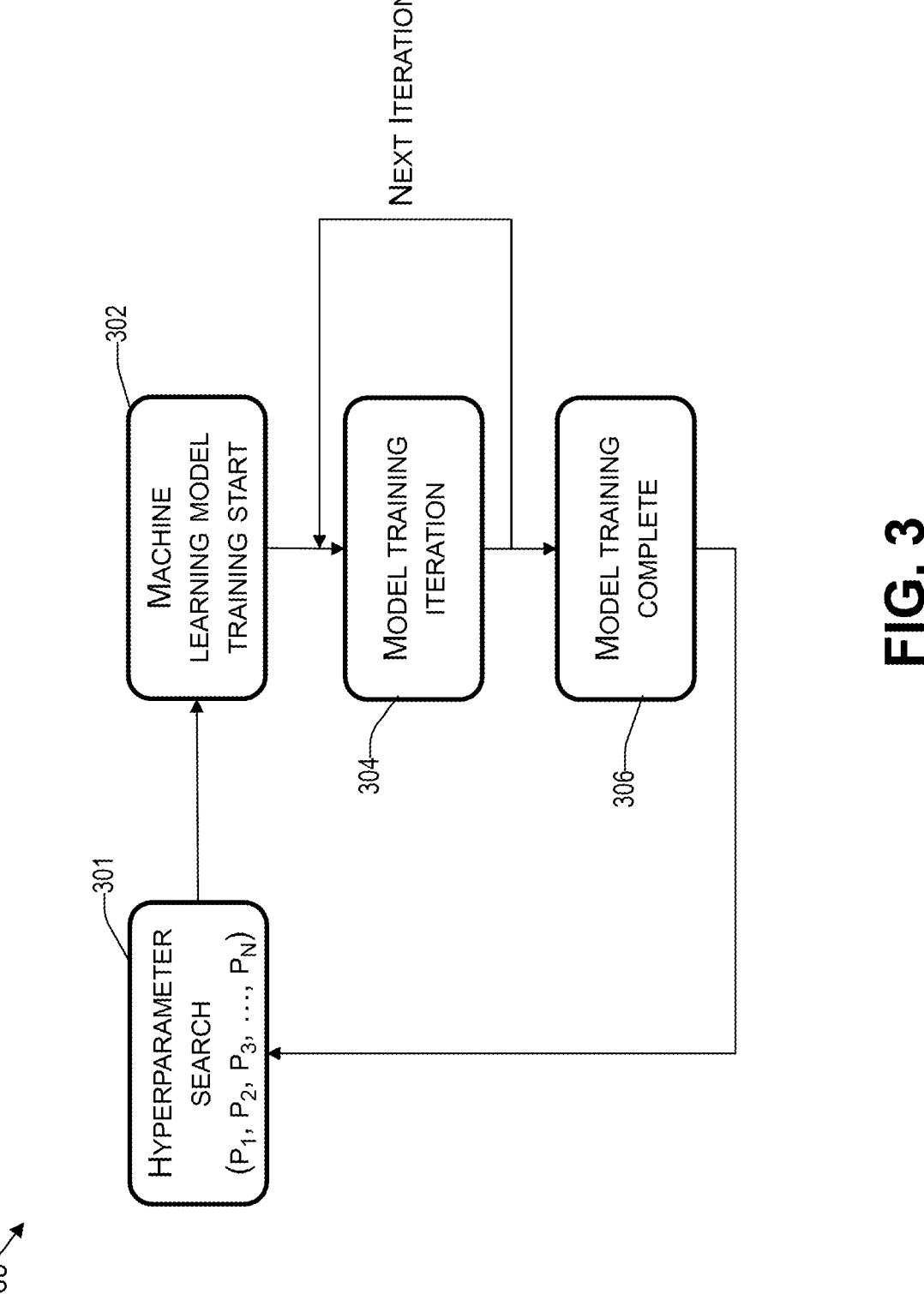
FIG. 3 is an example process for a known hyperparameter search and its iteration loop to learn batched training data.

To better appreciate the features of the present disclosure, it may be helpful to describe by way of contrast. To that end, reference now is made to FIG. 3, which shows a process for a known hyperparameter search and its iteration loop to learn batched training data. At block 301, a combination of hyperparameters (p1, p2, p3, . . . , pn) is received as an input to a model training run. At block 302, the model training configuration takes the received hyperparameters and initiates the relevant data structures and algorithms.

At block 304, a model training process (which is usually iterative) may be performed by dividing training data into batches to learn and update model internal coefficients. The iteration can be skipped if the entire training data fits into main memory and can be consumed directly. At block 306, after model training is completed, a cross validation or holdout data is used to evaluate the performance, usually measured in accuracy. This combination of hyperparameters is then associated with the measured performance. The program control then returns to block 301 to start on another combination of hyperparameters.

Figure 4:
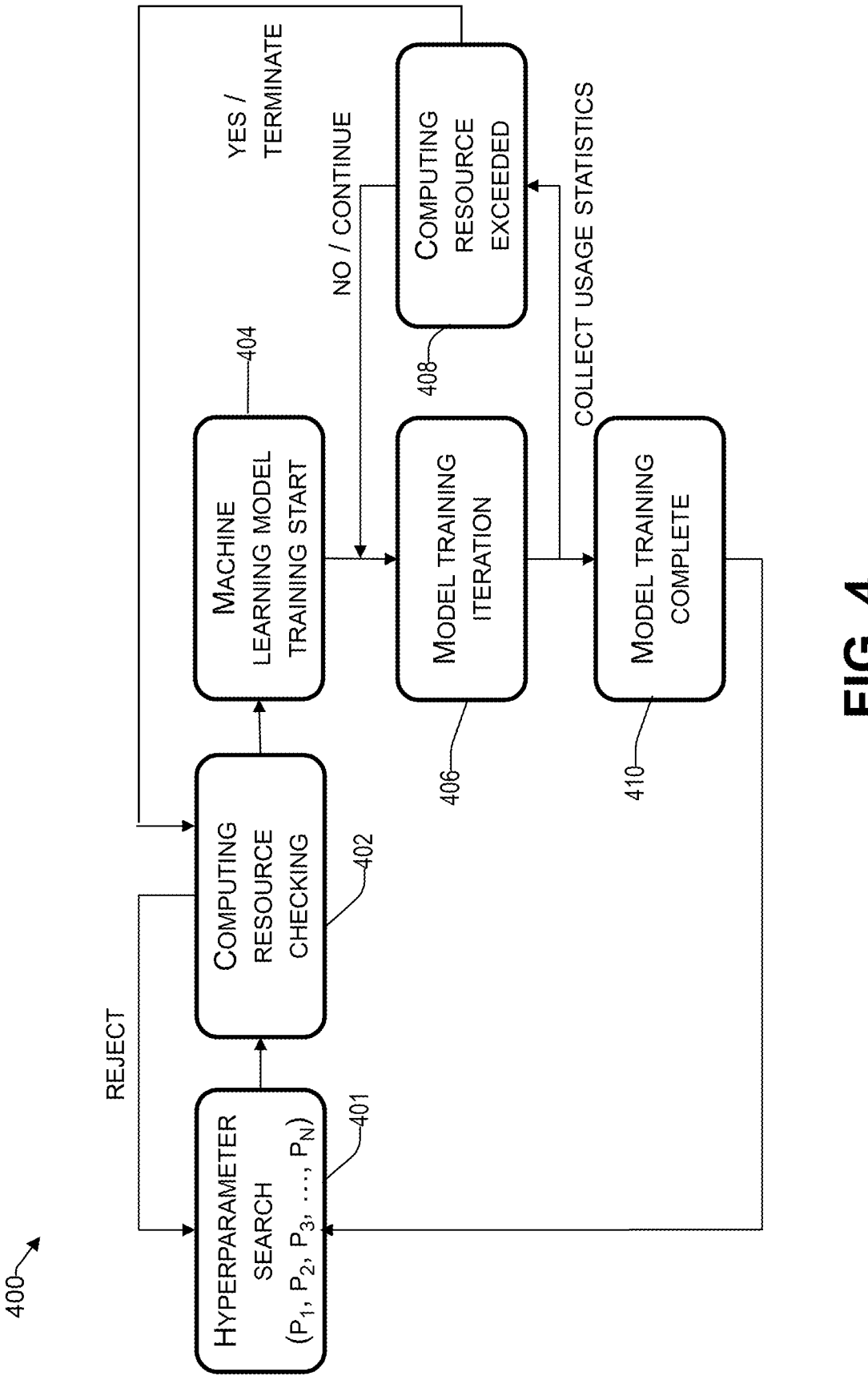
FIG. 4 provides an example process involving computing resource checking and usage statistics collection to facilitate an early termination when resource utilization exceeds predetermined limits, consistent with an illustrative embodiment.

In contrast, the teachings herein provide a more advanced process by including additional components that facilitate a reduction in computational overhead while improving the speed of model training. In this regard FIG. 4 provides an example process 400 involving computing resource checking and usage statistics collection to facilitate an early termination when resource utilization exceeds predetermined limits and/or when a desired model accuracy is obtained, consistent with an illustrative embodiment.

At block 401, a combination of hyperparameters (p1, p2, p3, pn) is received as an input to a model training run. At block 402, the available computing resources are determined. For example, the computing resource determination may be against both completed and terminated hyperparameter combinations in the past. An example of hyperparameters (e.g., degrees of freedom) and their impact on computing resource usage is provided below:

training_data_batch_size: 10, positively correlated with GPU memory
convolutional_neural_network_layers: 10, positively correlated with GPU memory
maximum_number of training_steps: 1500, positively correlated with time duration
convolutional_neural_network_learning_rate: 0.001, negatively correlated with time duration In various embodiments, correlations can be received from domain knowledge, user annotation, or experimental evidence through short probe runs with a small number of training steps such as 5 to 10 steps. For example, one or multiple hyper parameters can be tweaked, while monitoring resources. An estimation is performed, through extrapolation, if such set of hyperparameters may fit the available resources. A multi-dimensional grid of permissible combinations is incrementally built. In one embodiment, a correlation of the hyperparameters to the computing resource utilization is inferred by measuring an increasing or decreasing trend of utilization metrics when a hyperparameter is changed in magnitude.

A resource checking logic may elect to reject the proposed combination or accept and forward it. The checking logic uses an admissible region to determine the action, described in more detail later. If the identified computing resources are not adequate for the combination of hyperparameters, they are rejected. However, upon determining that the computational resources are sufficient, the process continues with block 404, where the model training initialization takes the received hyperparameters and initiates the relevant data structures and algorithms. Data batching may be by random grouping by the batch size specified as one of the hyperparameters. Batch size impacts model learning convergence rate and cannot be too small nor too large, and thus needs to be explored for the best value. For example, a convolutional neural network (CNN) can be set up with a desired size and number of hidden layers, based on the received hyperparameters.

At block 406, a model training process (which may be iterative) is performed by dividing training data into batches through random grouping to learn and update model internal coefficients, such as weights in convolutional neural network or centroid locations in K-Nearest Neighbor clustering. The iteration can be skipped if the entire training data fits into main memory and can be consumed directly. Significantly, after every model training iteration 406, computing resource utilization metrics (e.g., statistics), such as maximum and mean main memory usage, maximum and mean GPU memory usage, maximum and mean CPU utilization, maximum and mean GPU utilization, etc., are collected at block 408. In this way, an intelligent decision can be made whether to terminate or continue to the next training iteration. If resource usage exceeds the allowed limit, the process terminates the current training run and logs the hyperparameter combination and its early termination. However, if at block 408 it is determined that the computing resource usage is operating within predetermined limits, the iteration continues until the current run is completed (i.e., all allowed hyperparameter combinations have been evaluated or a user-specified model accuracy threshold has been reached). If it is determined that the iteration is to be terminated, the 402 receives notification of completed runs and their hyperparameter combinations. At block 402, a tally of hyperparameter combinations and their outcome are kept, to update the decision logic, illustrated and described in FIG. 8.

At block 410, after model training is completed, a cross validation or holdout data is used to evaluate the performance (e.g., model accuracy measured by prediction errors, forecasting errors, classification errors, etc. in the problem context). This combination of hyperparameters is then associated with the measured performance. The process then returns to block 401 to start on another combination of hyperparameters, sometimes referred to herein as a hyperparameter point of a hyperparameter tuning strategy.

Figure 5:
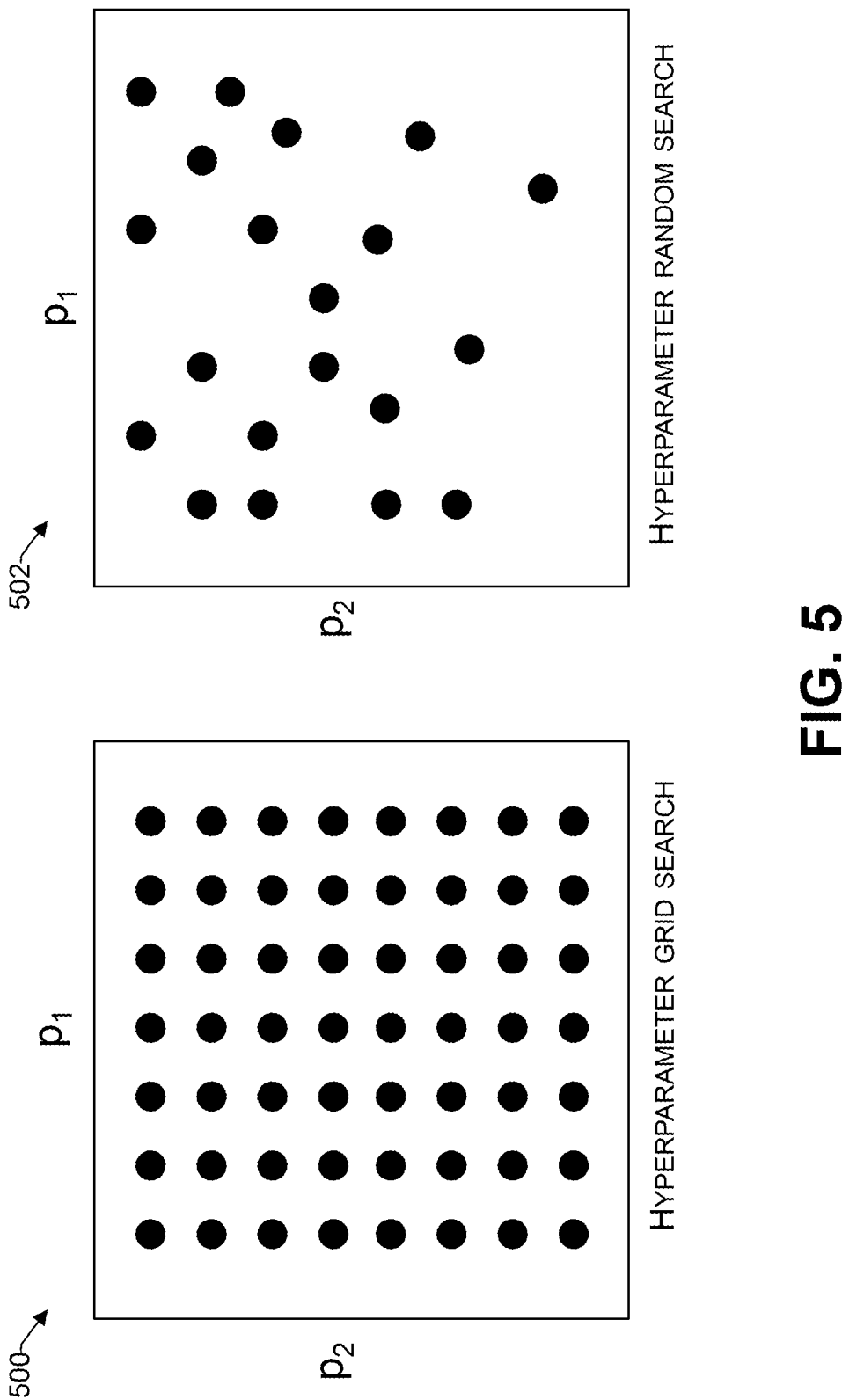
FIG. 5 illustrates two hyperparameter tuning strategies, consistent with an illustrative embodiment.

FIG. 5 illustrates two hyperparameter tuning strategies, consistent with an illustrative embodiment. More specifically, a grid search 500 and a random search 502 are illustrated, respectively. For example, two hyperparameters (p1, p2) are depicted with their combinations represented by corresponding solid black dots (i.e., hyperparameter point). In grid search 500, hyperparameter search is expected to visit all dots in the area represented by each picture. In random search 502, hyperparameter combinations or dots are randomly picked. Accordingly, the best combination is found by chance, at possibly shorter tuning time as compared to hyperparameter grid search 500.

For example, a grid search 500, sometimes referred to as a parameter sweep, provides an exhaustive search through a (e.g., manually) specified subset of the hyperparameter space of a learning algorithm. A grid search algorithm is guided by a performance metric, typically measured by cross-validation on the training set or evaluation on a hold-out validation set. In one embodiment, GridSearchCV can be used for a hyperparameter tuning strategy to exhaustively search over specified parameter values for an estimator, as provided by way of example hereinbelow:

class sklearn.model_selection.GridSearchCV(estimator, param_grid, *, scoring=None, n_jobs=None, refit=True, cv=None, verbose=0, pre_dispatch="2*n_jobs, error_score=nan, return_train_score=False)

param_grid: dict or list of dictionaries

Dictionary with parameters names (str) as keys and lists of parameter settings to try as values, or a list of such dictionaries, in which case the grids spanned by each dictionary in the list are explored. This enables searching over any sequence of parameter settings.

The random search 502, replaces the exhaustive enumeration of all combinations by selecting them randomly. Such approach can be applied to the discrete setting described above, as well as generalized to continuous and mixed spaces. It can outperform grid search, especially when only a small number of hyperparameters affects the final performance of the machine learning algorithm.

Figure 6:
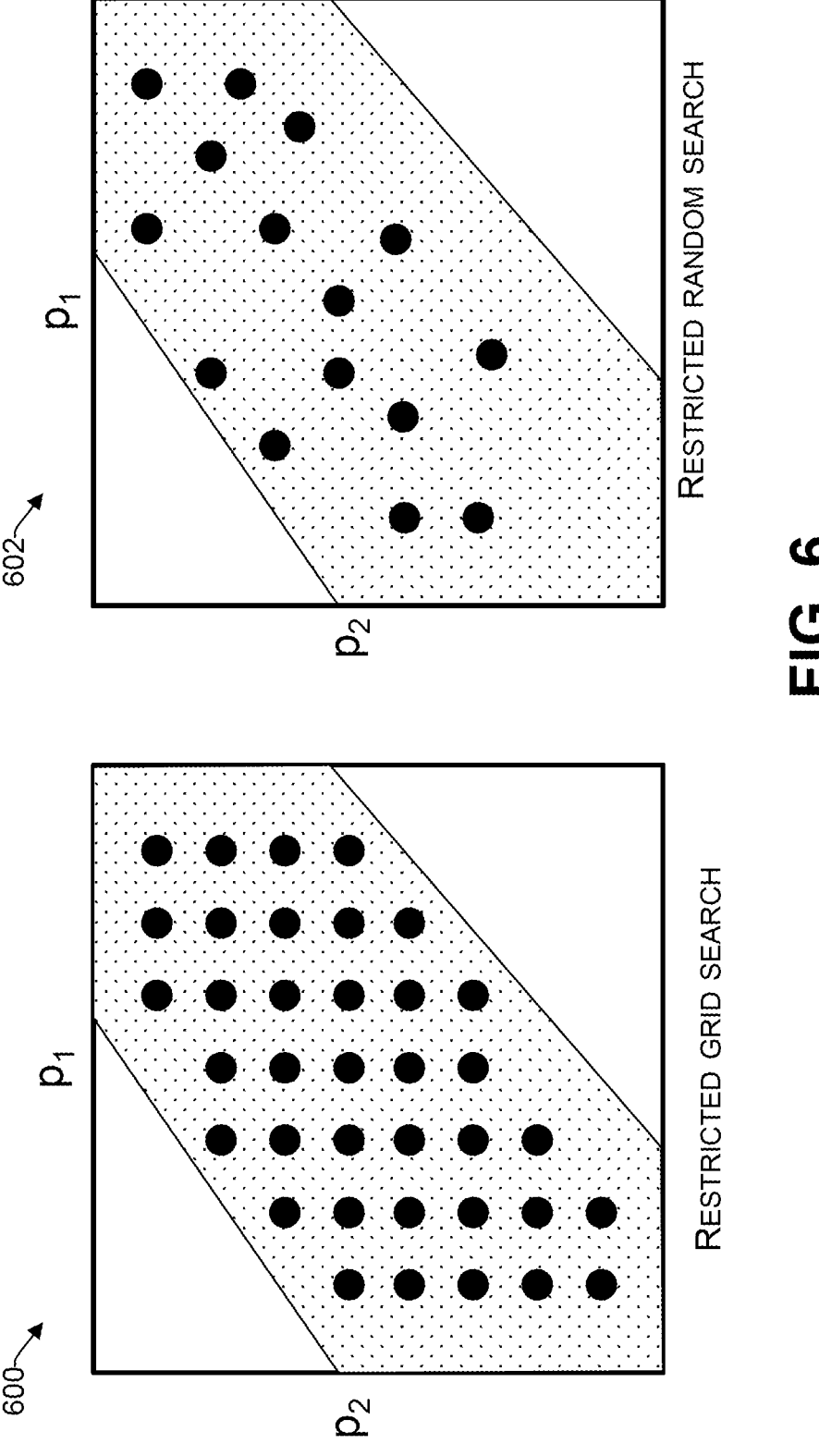
FIG. 6 depicts a grid search and a random search, respectively, having computing resource usage limits, consistent with an illustrative embodiment.

FIG. 6 depicts a grid search 600 and a random search 602, respectively, having computing resource usage limits, consistent with an illustrative embodiment. More specifically, FIG. 6 depicts an admissible region (e.g., envelope), or hyperparameter combinations (e.g., points) allowed by a computing resource budget, marked as shaded regions in FIG. 6. For example, for a restricted grid search 600 and restricted random search 602, (p1, p2) combinations in shaded areas do not exceed computing resource usage limits, while combinations in non-shaded areas are not allowed (i.e., identified as exceeding allocated computing resources). An admissible region may be conceptualized as a geometric convex hull shape in the hyperparameter space or a trained binary classifier to flag a combination as pass or fail. An admissible region (e.g., envelope) represents the frontier of hyperparameter combinations to keep model training under limited and/or shared resources. For example, increasing deep learning model depth may increase GPU memory utilization. Increasing training batch size may increase CPU-GPU transfer data rate. While FIG. 6 depicts a two-dimensional grid to facilitate the present discussion, it will be understood that a three-dimensional grid is within the scope of the present teachings.

Figure 7:
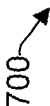
FIG. 7 shows a process to monitor resource usage and record combinations of hyperparameters, consistent with an illustrative embodiment.

FIG. 7 shows a process 700 to monitor resource usage and record combinations of hyperparameters, consistent with an illustrative embodiment. At block 701 a search grid is received. At block 702, a new training execution run is initialized with a randomly picked grid point. At block 704, computing resource usage is monitored to measure various computing resources, such as CPU, GPU, memory utilization, etc. In one embodiment, Python language packages psutil and nvidia-ml-py may be used, although other system resource monitoring tools could be used as well.

At block 706, aggregated usage is checked to determine if any predetermined limits are exceeded. If exceeded, the run is terminated and the hyperparameter combination (e.g., hyperparameter point of a hyperparameter tuning strategy) is logged as terminated. If the predetermined limits are not exceeded, the run continues to completion and logged as completed. The process 700 of FIG. 7 may be executed multiple times to establish an admissible region in a hyperparameter tuning strategy.

FIG. 8 provides a possible continuation of the process of FIG. 7, consistent with an illustrative embodiment. In one embodiment, process 800 of FIG. 8 is performed after multiple combinations of hyperparameters are labeled as completed or terminated, represented by block 802, which is substantially similar to block 708 of FIG. 7. At block 804, a mapping of the admissible region bordered by completed combinations is provided.

At block 804, when the number of hyperparameters is small, as depicted on a 2D plot 602 in FIG. 6, the admissible region is the largest convex hull whose vertices are coordinates of completed combinations and there are no terminated combinations inside the polygon identifying the admissible region of operation for hyperparameter parameter combinations.

When the number of hyperparameters is large (e.g., 10 or greater), constructing a convex hull can be more computationally complex. An alternate implementation is to train a binary classifier, such as (without limitation) a logistic regression or decision tree, to be the admissible region of operation. The input to the classifier may be the tabulated rows of hyperparameter combinations with completed (e.g., pass) or terminated (e.g., fail) as classification labels. In one embodiment, both the convex hull and the binary classifier, representing the admissible region, can be updated with new information.

At block 806, the decision logic is created by checking if a proposed hyperparameter combination is inside the convex hull or its classification label is positively flagged as pass.

Figure 9:
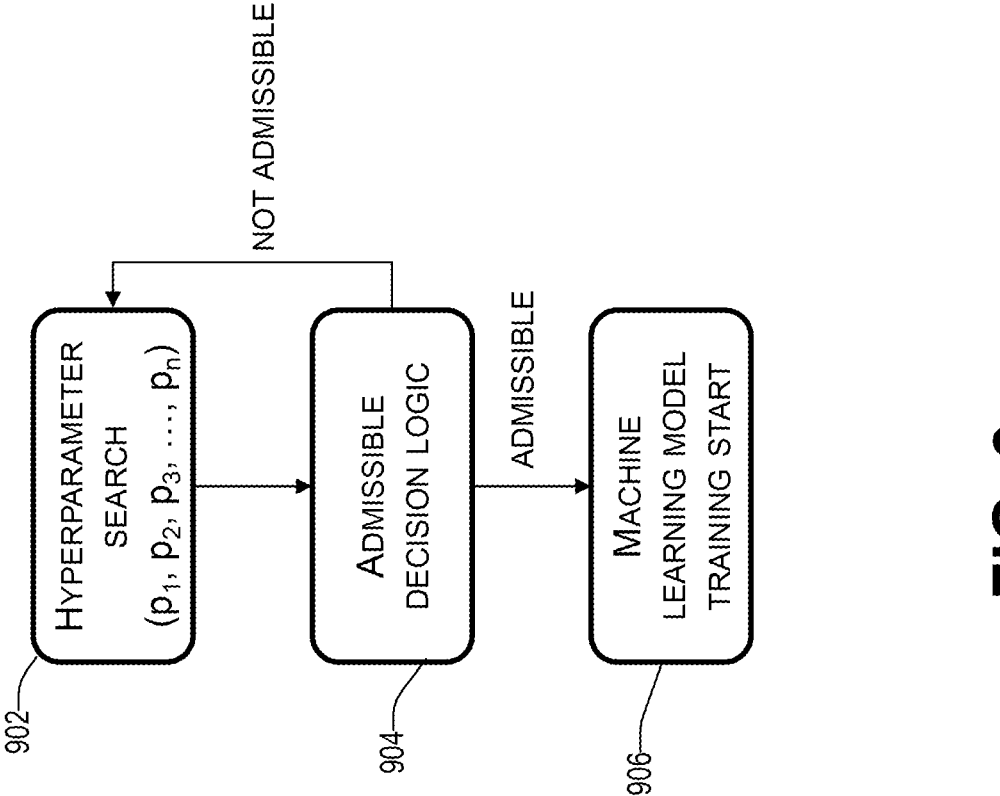
FIG. 9 shows an example process to check if a new hyperparameter combination is in the admissible region before starting a new model training run, consistent with an illustrative embodiment.

FIG. 9 shows a process 900 to check if a new hyperparameter combination is in the admissible region before starting a new model training run, consistent with an illustrative embodiment. For example, at block 902, a new hyperparameter combination is received. At block 904, the decision logic created in block 806 of FIG. 8 can be used to determine whether the new hyperparameter combination should be admitted or rejected (i.e., whether or not it exceeds the allocated computational resources). For example, if the operating point is outside of a convex region of a known multi-dimensional grid, the run is rejected. If rejected, the process returns to block 902. However, if admissible, the process continues with block 906, where machine learning model training is started. After a new training run starts, resource monitoring may observe utilization beyond limits and terminate the run early. In one embodiment, if the new set of hyperparameters is outside the convex region of a known multi-dimensional grid of allowable parameters, a recommendation may be provided to scale back one or more hyperparameters known to reduce resource usage. In one embodiment, if an operating point cannot be determined, probe runs are initiated to determine a set of allowable hyperparameters. Infeasible parameters can be rejected to skip violating training runs, thereby avoiding any early termination in model training.

Figure 10:
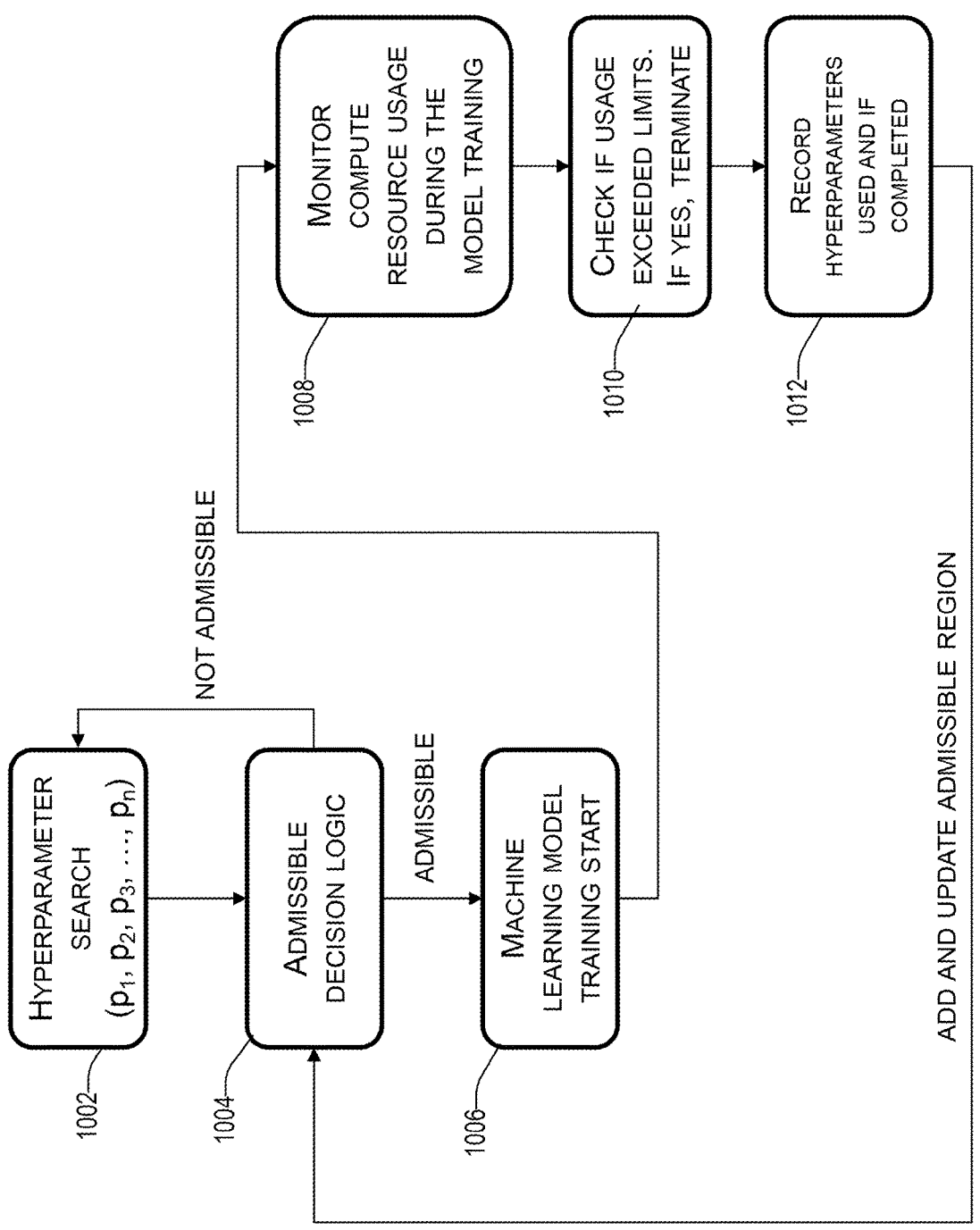
FIG. 10 shows an example process that combines completed and terminated hyperparameters to update an admissible region for the decision logic, consistent with an illustrative embodiment.

FIG. 10 shows a process 1000 that combines completed and terminated hyperparameters to update an admissible region for the decision logic, consistent with an illustrative embodiment. Process 1000 synthesizes various features discussed herein to provide a more comprehensive restricted hyperparameter search.

At block 1002, a proposed hyperparameter combination is received. For example, the hyperparameter combination may be provided by user defined strategy such as grid search or random search. At block 1004, an admissible decision logic is used to check if the hyperparameter combination lies in an admissible region, as described through the process discussed in the context of FIG. 9.

At block 1006, model training commences and its running time execution in the server is monitored at block 1008. At block 1010, a determination of computing resources is made. If a computing resource usage limit is exceeded, the iteration is terminated. However, if computing resource limits are not exceeded, the model training iterations are allowed to continue by loading the next batch of data, until the maximum number of training steps is reached. At block 1012, the hyperparameters used and whether or not they were completed or terminated are recorded and the process continues with block 1004 with an updated admissible region. In various embodiments, the teachings herein can be adapted to running a container such as Docker or a networked cluster with multiple computing nodes such as a Kubernetes cluster.

Figure 11:
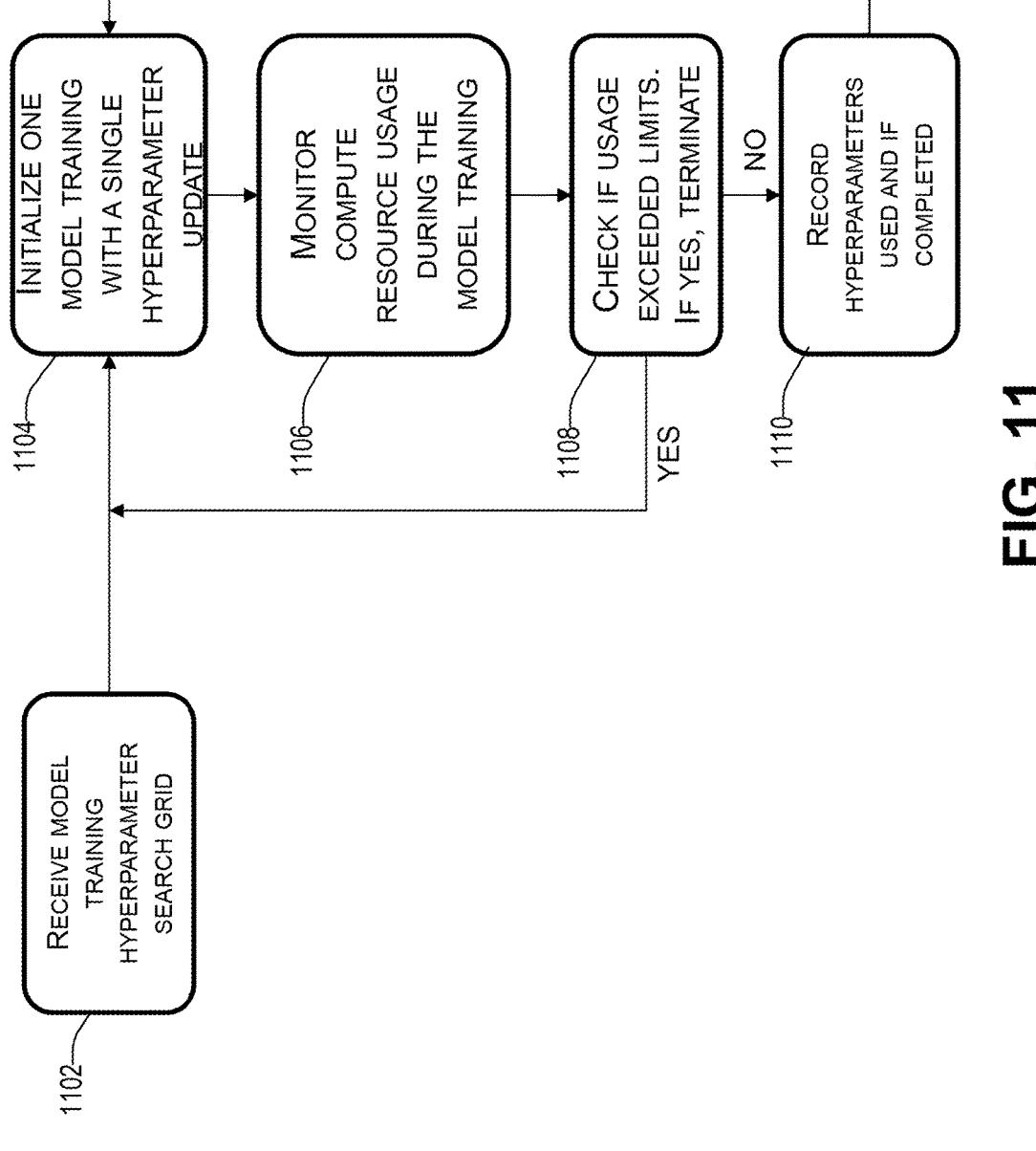
FIG. 11 shows a process to probe the directions of resource usage as one hyperparameter increases or decreases, consistent with an illustrative embodiment.

FIG. 11 shows a process 1100 to probe the directions of resource usage as one hyperparameter increases or decreases, consistent with an illustrative embodiment. At block 1102, a model training hyperparameter search grid is received. At block 1104, in contrast to process 700 of FIG. 7, instead of selecting a combination randomly as in block 802, only a single hyperparameter value is changed to compare to previous combinations 1102. The changed value may be derived as increasing or decreasing a stepped value to its neighbor on the search grid. The hyperparameter chosen at each time could be random or scanned in a fixed order given by a user. At block 1106, computing resource usage is monitored to measure various computing resources, such as CPU, GPU, memory utilization, etc. In one embodiment, Python language packages psutil and nvidia-ml-py may be used, although other system resource monitoring tools could be used as well.

At block 1108, aggregated usage is checked to determine if any predetermined limits are exceeded. If exceeded, the run is terminated and the hyperparameter combination (i.e., hyperparameter point) is logged as terminated. If the predetermined limits are not exceeded, the run continues to completion at block 1110 and logged as completed.

By way of example, consider a 2-hyperparameter search. Increasing p1 while holding p2 constant could lead to increased usage for some resources and decreased usage for others. If at some p1_value, say p1_limit, resource usage already exceeds an allowed threshold, then any p1>=p1_limit, assuming other hyperparameters are the same, should not be accepted.

In one embodiment, there could be a user annotated directional hint, such as the increase of p1 leads to increase in CPU, GPU but no increase in memory usage and the increase of p2 leads to increase in memory usage but no impact in CPU utilization. The annotated directional hints can be included in block 1104 to probe the boundaries of the admission region. The process 1100 of FIG. 11 may be executed multiple times to establish an admissible region.

Example Computer Platform

Figure 12:
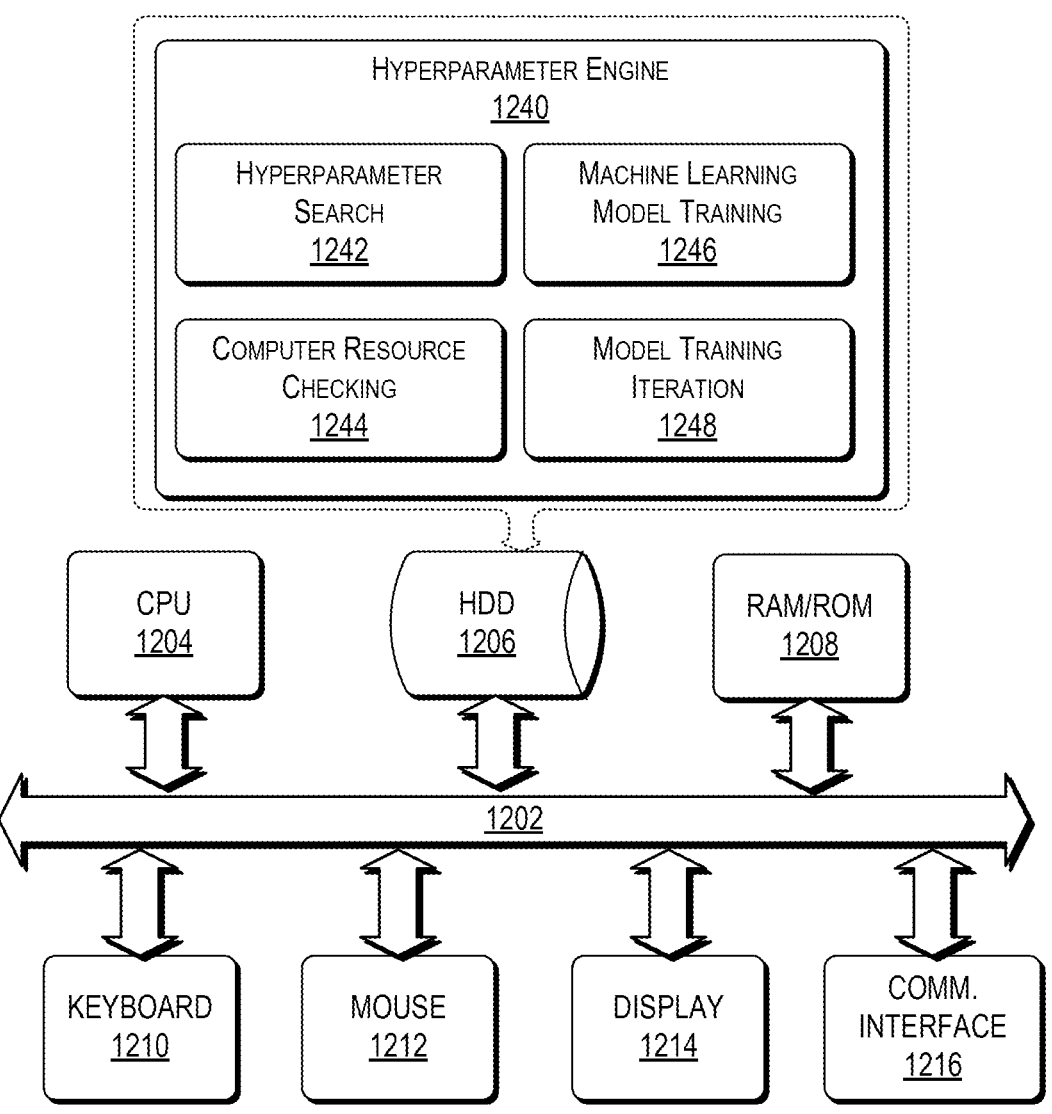
FIG. 12 is a functional block diagram illustration of a particularly configured computer hardware platform that can be used to implement a hyperparameter engine.

As discussed above, functions relating to automatically tuning hyperparameters used in machine learning based on monitored computing resources, and other functions discussed herein, can be performed with the use of one or more computing devices connected for data communication via wireless or wired communication, as shown in FIG. 2. FIG. 12 is a functional block diagram illustration of a particularly configured computer hardware platform that can be used to implement the computing device discussed in the context of FIG. 2.

The computer platform 1200 may include a central processing unit (CPU) 1204, a hard disk drive (HDD) 1206, random access memory (RAM) and/or read only memory (ROM) 1208, a keyboard 1210, a mouse 1212, a display 1214, and a communication interface 1216, which are connected to a system bus 1202.

In one embodiment, the HDD 1206, has capabilities that include storing a program that can execute various processes, such as the hyperparameter engine 1240, in a manner described herein. The hyperparameter engine 1240 may have various modules configured to perform different functions. For example, there may be a hyperparameter search engine operative to receive a combination of hyperparameters (p1, p2, p3, pn) as an input to a model training run. There may be a computing resource checking engine 1244 operative to determine the available computing resources as well as determine the computing resources used during the training. There may be a machine learning model training module 1246 operative to train a model without exceeding allocated and/or available computational resources. There may be a model training iteration module 1248 operative to continue the iterative model training until a predetermined threshold accuracy is achieved.

Example Cloud Platform

As discussed above, functions relating to automatically tuning hyperparameters used in machine learning based on monitored computing resources, may include a distributed computing and/or storage architecture, as in a cloud. It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 13:
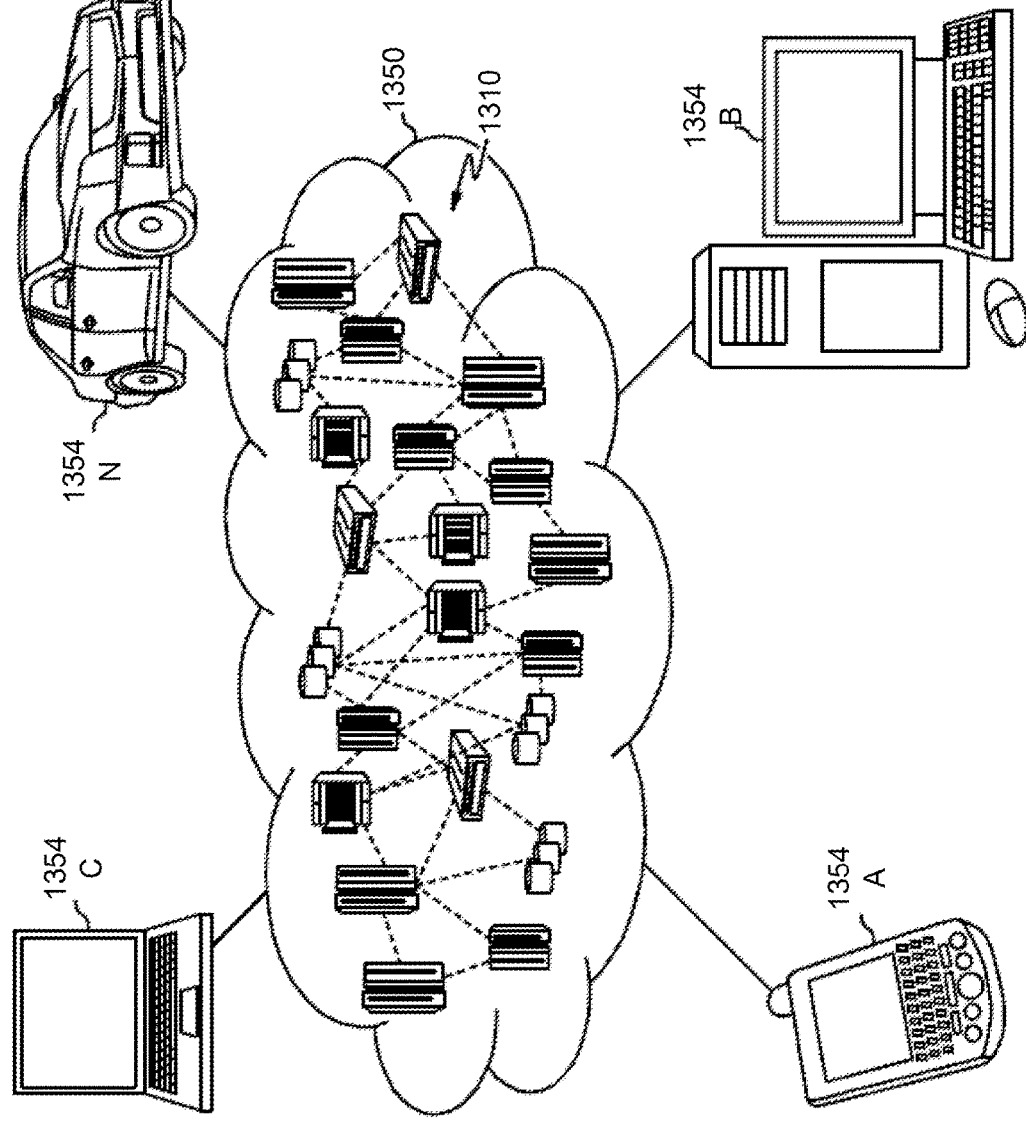
FIG. 13 depicts a cloud computing environment, consistent with an illustrative embodiment.

Referring now to FIG. 13, an illustrative cloud computing environment 1300 is depicted. As shown, cloud computing environment 1300 includes one or more cloud computing nodes 1310 with which local computing devices used by cloud consumers, such as, for example, personal digital assistant (PDA) or cellular telephone 1354A, desktop computer 1354B, laptop computer 1354C, and/or automobile computer system 1354N may communicate. Nodes 1310 may communicate with one another. They may be grouped (not shown) physically or virtually, in one or more networks, such as Private, Community, Public, or Hybrid clouds as described hereinabove, or a combination thereof. This allows cloud computing environment 1350 to offer infrastructure, platforms and/or software as services for which a cloud consumer does not need to maintain resources on a local computing device. It is understood that the types of computing devices 1354A-N shown in FIG. 13 are intended to be illustrative only and that computing nodes 1310 and cloud computing environment 1350 can communicate with any type of computerized device over any type of network and/or network addressable connection (e.g., using a web browser).

Figure 14:
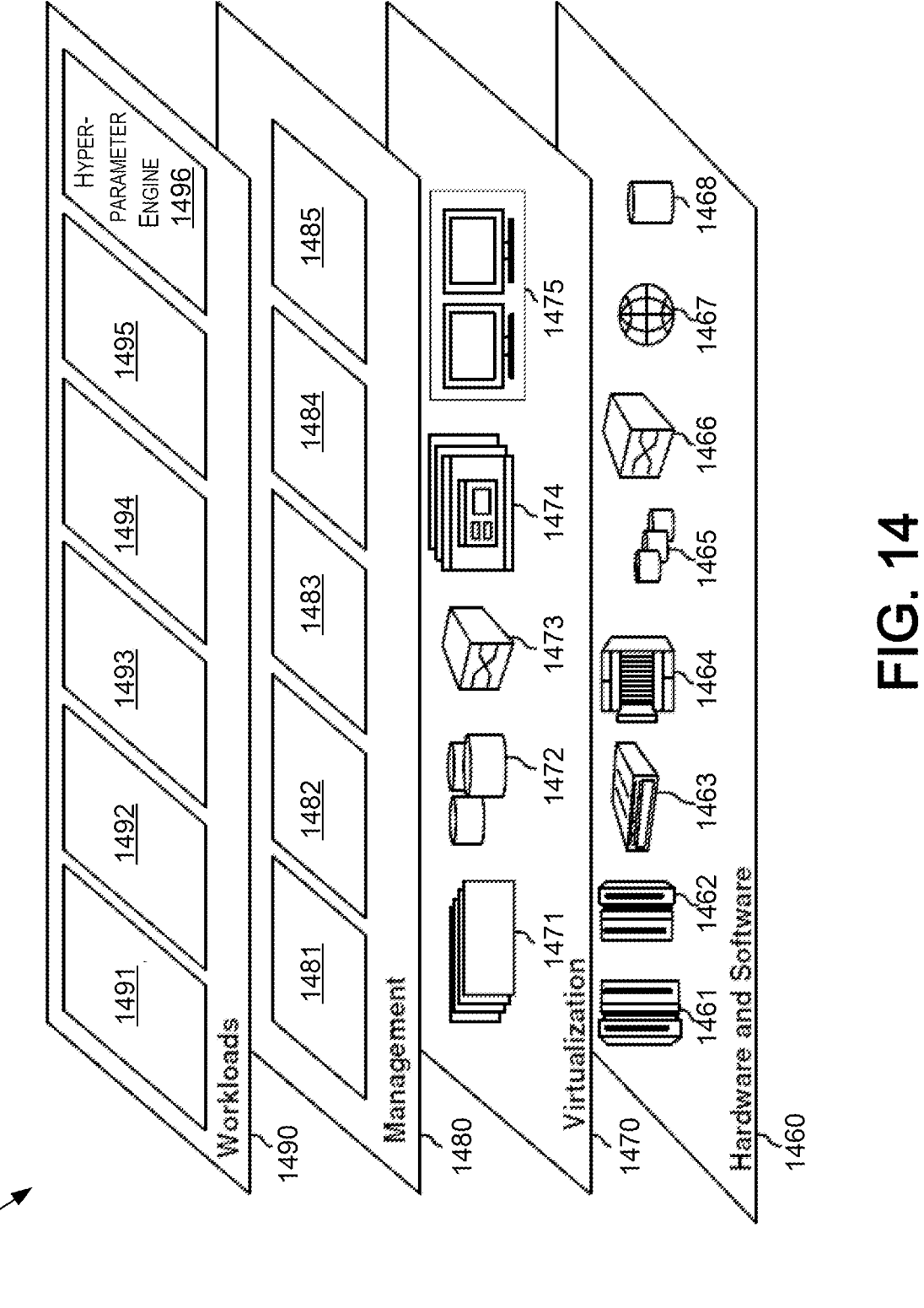
FIG. 14 depicts abstraction model layers, consistent with an illustrative embodiment.

Referring now to FIG. 14, a set of functional abstraction layers provided by cloud computing environment 1350 (FIG. 13) is shown. It should be understood in advance that the components, layers, and functions shown in FIG. 14 are intended to be illustrative only and embodiments of the disclosure are not limited thereto. As depicted, the following layers and corresponding functions are provided:

Hardware and software layer 1460 includes hardware and software components. Examples of hardware components include: mainframes 1461; RISC (Reduced Instruction Set Computer) architecture based servers 1462; servers 1463; blade servers 1464; storage devices 1465; and networks and networking components 1466. In some embodiments, software components include network application server software 1467 and database software 1468.

Virtualization layer 1470 provides an abstraction layer from which the following examples of virtual entities may be provided: virtual servers 1471; virtual storage 1472; virtual networks 1473, including virtual private networks; virtual applications and operating systems 1474; and virtual clients 1475.

In one example, management layer 1480 may provide the functions described below. Resource provisioning 1481 provides dynamic procurement of computing resources and other resources that are utilized to perform tasks within the cloud computing environment. Metering and Pricing 1482 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1483 provides access to the cloud computing environment for consumers and system administrators. Service level management 1484 provides cloud computing resource allocation and management such that required service levels are met. Service Level Agreement (SLA) planning and fulfillment 1485 provide pre-arrangement for, and procurement of, cloud computing resources for which a future requirement is anticipated in accordance with an SLA.

Workloads layer 1490 provides examples of functionality for which the cloud computing environment may be utilized. Examples of workloads and functions which may be provided from this layer include: mapping and navigation 1491; software development and lifecycle management 1492; virtual classroom education delivery 1493; data analytics processing 1494; transaction processing 1495; and Translation Engine 1496, as discussed herein.

CONCLUSION

The descriptions of the various embodiments of the present teachings have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing has described what are considered to be the best state and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

The components, steps, features, objects, benefits and advantages that have been discussed herein are merely illustrative. None of them, nor the discussions relating to them, are intended to limit the scope of protection. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Numerous other embodiments are also contemplated. These include embodiments that have fewer, additional, and/or different components, steps, features, objects, benefits and advantages. These also include embodiments in which the components and/or steps are arranged and/or ordered differently.

Aspects of the present disclosure are described herein with reference to a flowchart illustration and/or block diagram of a method, apparatus (systems), and computer program products according to embodiments of the present disclosure. The processes discussed herein are each illustrated as a collection of blocks representing a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or performed in parallel to implement the process.

It will be understood that each block of the flowchart illustrations and/or block diagrams, and combinations of blocks in the flowchart illustrations and/or block diagrams, can be implemented by computer readable program instructions. These computer readable program instructions may be provided to a processor of an appropriately configured computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The call-flow, flowchart, and block diagrams in the figures herein illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments have more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A computing device, comprising:
a processor;
a network interface coupled to the processor to enable communication over a network;
a storage device for content and programming coupled to the processor; and
a hyperparameter engine stored in the storage device, wherein an execution of the hyperparameter engine by the processor configures the computing device to perform operations comprising:
receiving a first hyperparameter tuning strategy;
based on determining that one or more computing resources exceed their corresponding predetermined quota for the first hyperparameter tuning strategy, rejecting the first hyperparameter tuning strategy and receive a second hyperparameter tuning strategy different from the first hyperparameter tuning strategy,
wherein the determining, that the one or more computing resources exceed their corresponding predetermined quota for the first hyperparameter tuning strategy, is based on each hyperparameter point of the first hyperparameter tuning strategy being within an admissible region of a geometric convex hull in a hyperparameter space of the first hyperparameter tuning strategy;
based on determining that the one or more computing resources do not exceed their corresponding predetermined quota for the second hyperparameter tuning strategy, running a machine learning model training with a first hyperparameter point of the second hyperparameter tuning strategy;
monitoring, during each iteration of the machine learning model training, computing resource utilization for the first hyperparameter point;
based on determining that the computing resource utilization exceeds one or more predetermined computing resource usage limits for the first hyperparameter point:
terminating the running of the machine learning model training for the first hyperparameter point;
updating the admissible region based on the terminating of the machine learning model training, wherein the first hyperparameter point lies outside of the updated admissible region; and
running the machine learning model training with a second hyperparameter point, different from the first hyperparameter point, of the second hyperparameter tuning strategy;
based on determining that the machine learning model training is complete, collecting training results and determining computing resource utilization metrics;
learning, from the updated admissible region and the completion of the machine learning model training, a correlation of one or more hyperparameters of the second hyperparameter tuning strategy to the computing resource utilization; and
utilizing the learned correlation of the one or more hyperparameters to select hyperparameter points for subsequent machine leaning training runs.

2. The computing device of claim 1, wherein the first hyperparameter point of the second hyperparameter tuning strategy is selected randomly.

3. The computing device of claim 1, wherein the correlation of the one or more hyperparameters to the computing resource utilization is learned additionally based on one or more recorded previously successful completed machine learning model trainings.

4. The computing device of claim 1, wherein the correlation of the one or more hyperparameters to the computing resource utilization is learned based on a probe run.

5. The computing device of claim 4, wherein the probe run generates a multi-dimensional grid of the one or more hyperparameters of permissible hyperparameter combinations.

6. The computing device of claim 1, wherein the second hyperparameter tuning strategy is based on a grid search.

7. The computing device of claim 1, wherein the second hyperparameter tuning strategy is based on a random search.

8. The computing device of claim 1, wherein the running of the machine learning model training further comprises:
dividing a training data into predetermined batches; and
iteratively running each training batch of the predetermined batches.

9. The computing device of claim 1, wherein the correlation of the one or more hyperparameters to the computing resource utilization is learned by measuring an increasing or decreasing trend of the computing resource utilization metrics in a case where a hyperparameter of the one or more hyperparameters is changed in magnitude.

10. The computing device of claim 1, wherein the execution of the hyperparameter engine by the processor configures the computing device to perform the operations further comprising:
based on the determining that the computing resource utilization exceeds the one or more predetermined computing resource usage limits for the first hyperparameter point:
logging the termination of the machine learning model training for the first hyperparameter point;
updating the admissible region based on the logged termination of the machine learning model training; and
running the machine learning model training with the second hyperparameter point that lies within the updated admissible region, wherein
the admissible region corresponds to a region comprising one or more hyperparameter points of one or more hyperparameter tuning strategies that are feasible for the machine learning model training without exceeding a computational resource budget, and
the one or more hyperparameter tuning strategies includes the first hyperparameter tuning strategy and the second hyperparameter tuning strategy.

11. A non-transitory computer readable storage medium tangibly embodying a computer readable program code having computer readable instructions that, when executed, causes a computing device to carry out a method of automatically tuning hyperparameters, the method comprising:
receiving a first hyperparameter tuning strategy;

based on determining that one or more computing resources exceed their corresponding predetermined quota for the first hyperparameter tuning strategy, rejecting the first hyperparameter tuning strategy and receiving a second hyperparameter tuning strategy different from the first hyperparameter tuning strategy, wherein the determining, that the one or more computing resources exceed their corresponding predetermined quota for the first hyperparameter tuning strategy, is based on each hyperparameter point of the first hyperparameter tuning strategy being within an admissible region of a geometric convex hull in a hyperparameter space of the first hyperparameter tuning strategy;

based on determining that the one or more computing resources do not exceed their corresponding predetermined quota for the second hyperparameter tuning strategy, running a machine learning model training with a first hyperparameter point of the second hyperparameter tuning strategy;

monitoring, during each iteration of the machine learning model training, computing resource utilization for the first hyperparameter point;

based on determining that the computing resource utilization exceeds one or more predetermined computing resource usage limits for the first hyperparameter point:

terminating the running of the machine learning model training for the first hyperparameter point;

updating the admissible region based on the termination of the machine learning model training, wherein the first hyperparameter point lies outside of the updated admissible region; and running the machine learning model training with a second hyperparameter point, different from the first hyperparameter point, of the second hyperparameter tuning strategy;

based on determining that the machine learning model training is complete, collecting training results and determining computing resource utilization metrics;

learning, from the updated admissible region and the completion of the machine learning model training, a correlation of one or more hyperparameters of the second hyperparameter tuning strategy to the computing resource utilization; and utilizing the learned correlation of the one or more hyperparameters to select hyperparameter points for subsequent machine learning training runs.

12. The non-transitory computer readable storage medium of claim 11, wherein the learning of the correlation of the one or more hyperparameters to the computing resource utilization is additionally based on one or more recorded previously successful completed machine learning model trainings.

13. The non-transitory computer readable storage medium of claim 11, wherein the learning of the correlation of the one or more hyperparameters to the computing resource utilization is based on a probe run; and the probe run generates a multi-dimensional grid of the one or more hyperparameters of permissible hyperparameter combinations.

14. The non-transitory computer readable storage medium of claim 11, wherein the second hyperparameter tuning strategy is based on a grid search.

15. The non-transitory computer readable storage medium of claim 11, wherein the second hyperparameter tuning strategy is based on a random search.

16. The non-transitory computer readable storage medium of claim 11, wherein the running of the machine learning model training further comprises:

dividing a training data into predetermined batches; and iteratively running each training batch of the predetermined batches.

17. A computer implemented method of automatically tuning hyperparameters, the computer implemented method comprising:

receiving a first hyperparameter tuning strategy;

based on determining that one or more computing resources exceed their corresponding predetermined quota for the first hyperparameter tuning strategy, rejecting the first hyperparameter tuning strategy and receiving a second hyperparameter tuning strategy different from the first hyperparameter tuning strategy, wherein the determining, that the one or more computing resources exceed their corresponding predetermined quota for the first hyperparameter tuning strategy, is based on each hyperparameter point of the first hyperparameter tuning strategy being within an admissible region of a geometric convex hull in a hyperparameter space of the first hyperparameter tuning strategy;

based on determining that the one or more computing resources do not exceed their corresponding predetermined quota for the second hyperparameter tuning strategy, running a machine learning model training with a first hyperparameter point of the second hyperparameter tuning strategy;

monitoring, during each iteration of the machine learning model training, computing resource utilization for the first hyperparameter point;

based on determining that the computing resource utilization exceeds one or more predetermined computing resource usage limits for the first hyperparameter point:

terminating the running of the machine learning model training for the first hyperparameter point;

updating the admissible region based on the termination of the machine learning model training, wherein the first hyperparameter point lies outside of the updated admissible region; and running the machine learning model training with a second hyperparameter point, different from the first hyperparameter point, of the second hyperparameter tuning strategy;

based on determining that the machine learning model training is complete, collecting training results and determining computing resource utilization metrics;

learning, from the updated admissible region and the completion of the machine learning model training, a correlation of one or more hyperparameters of the second hyperparameter tuning strategy to the computing resource utilization; and utilizing the learned correlation of the one or more hyperparameters to select hyperparameter points for subsequent machine learning training runs.

18. The computer implemented method of claim 17, wherein the learning of the correlation of the one or more hyperparameters to the computing resource utilization is additionally based on one or more recorded previously successful completed machine learning model trainings.

19. The computer implemented method of claim 17, wherein the learning of the correlation of the one or more hyperparameters to the computing resource utilization is based on a probe run; and the probe run generates a multi-dimensional grid of the one or more hyperparameters of permissible hyperparameter combinations.

* * * * *